Oct. 19, 1937.   A. W. SIZER   2,096,529
EXTRUSION MOLDING MACHINE AND THE MANUFACTURE OF PELLETS THEREBY
Filed March 13, 1936   2 Sheets-Sheet 1

Inventor:
Albert W. Sizer
By: Mason & Porter
Attorneys

Patented Oct. 19, 1937

2,096,529

UNITED STATES PATENT OFFICE 2,096,529

EXTRUSION MOLDING MACHINE AND THE MANUFACTURE OF PELLETS THEREBY

Albert William Sizer, Hessle, England

Application March 13, 1936, Serial No. 68,774

4 Claims. (Cl. 107—14)

The present invention relates to improvements in extrusion molding machines of the type in which material fed to a compression chamber is conveyed along this and through perforations in a die-plate by a single or multiple start extrusion worm; and to an improved method of manufacturing pellets thereby.

In such machines, and particularly when the holes in the die-plate are of small diameter it may occur that the extruded pellets are too long to be a useful size, in that a long pellet of compressed material is extruded from a die perforation prior to being severed by the usual knife rotating with the worm.

In the arrangement of the present invention two or more cutting blades moving over the exterior surface of the die plate and in synchronism with the worm, are provided for each start of the extrusion worm.

That is to say if the worm is of the two start variety having a pair of threads thereon spaced peripherally by 180°, then two groups of cutting blades are provided, each group containing two, three or more blades.

The invention is more particularly described with reference to the accompanying drawings, in which:—

An extrusion worm 1 shown as of the single start type operates within the usual compression chamber 2 to force meal or other material through perforations 3 in a die plate 4.

Figure 1:
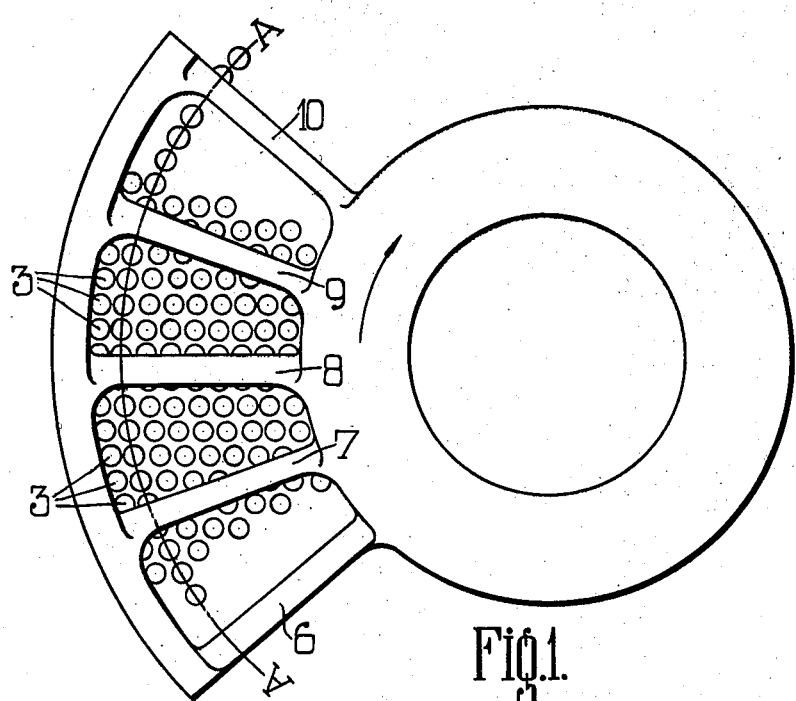
Figure 1 is an exterior front elevation of a die plate and knife element for a single start worm taken by way of example.

A cutting knife element 5 is keyed to and rotates with the worm 1 and in the arrangement shown has a group of five cutting blades 6, 7, 8, 9, 10 upon it conveniently formed as a lantern or grid segment as shown in Figure 1.

It is to be understood however that the knife element 5 may have only two or three or other multiple number of blades.

Figure 2:
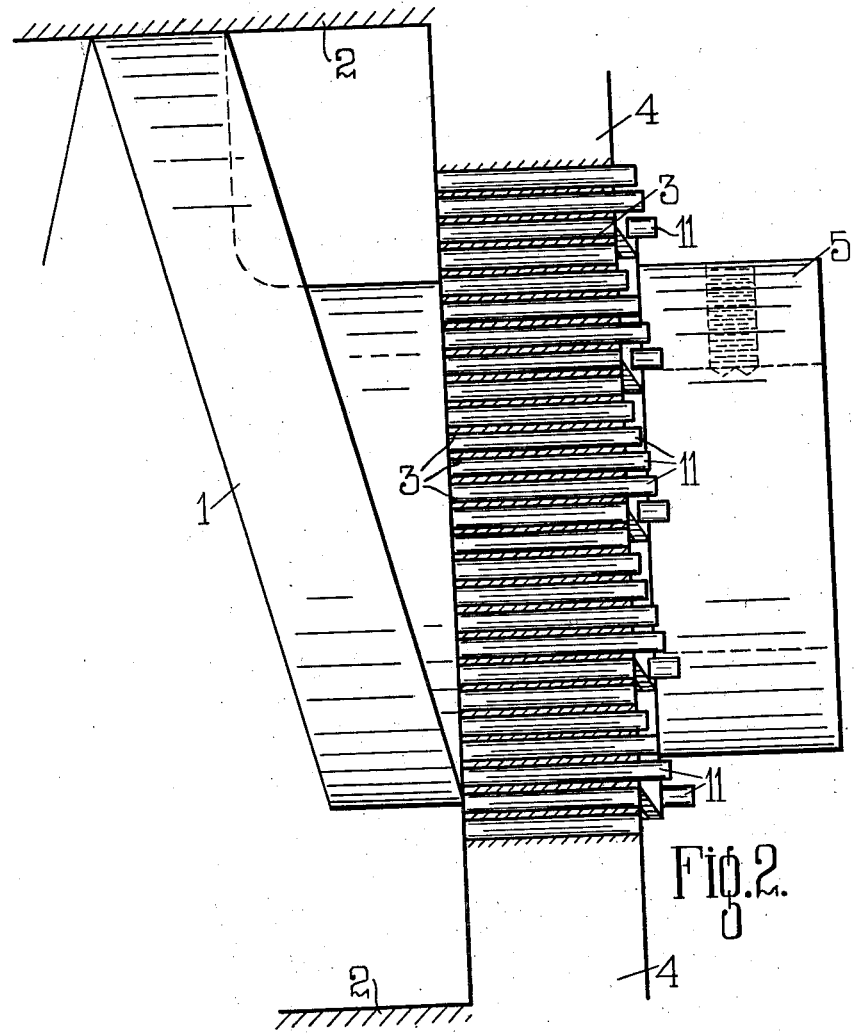
Figure 2 is a side sectional elevation through the end of the worm, die plate and knives of an extrusion press, corresponding to Figure 1.

As seen from Figure 2 pellets 11 are severed before they reach the full length to which they would be extruded in a single revolution of the worm.

Figure 3:
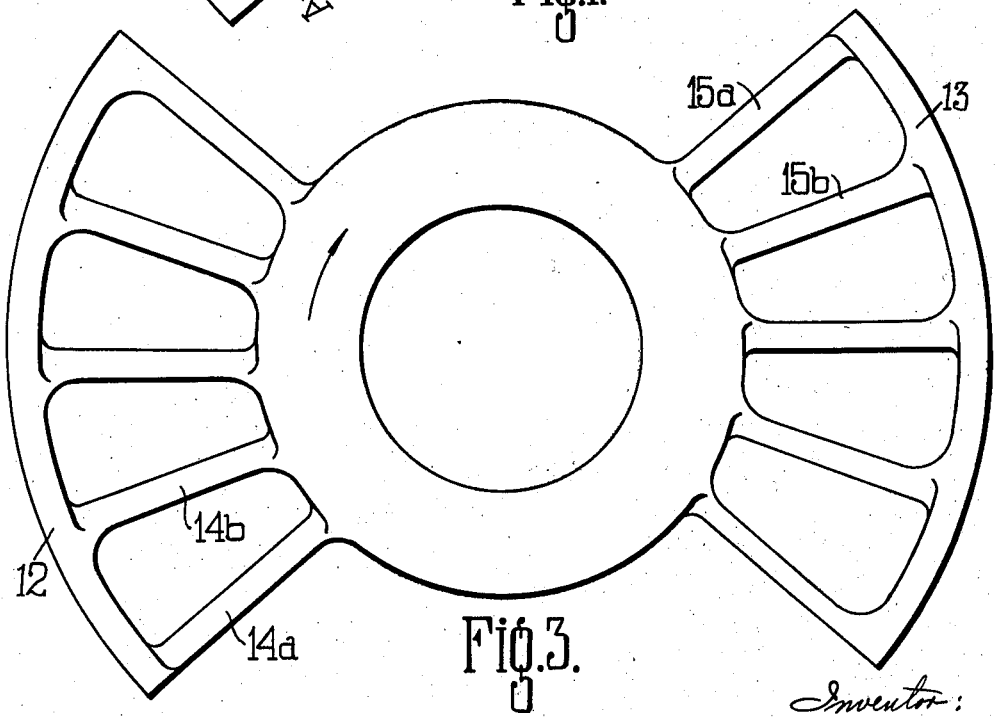
Figure 3 is a similar view to Figure 1, showing the cutting knife element for a two start worm machine.

In the case of a two-start worm, the corresponding knife element would be as shown in Figure 3 having two cutting blade segments 12, 13 spaced by 180° and each comprising a plurality of cutting blades 14a, 14b, 15a, 15b.

It will be seen that the cutting blades are spaced by an angle which in the case of a single start worm is less than 360° and in the case of a double start worm is less than 180°, the angularity of the worm start or starts.

I declare that what I claim is:—

1. An extrusion molding machine including in combination a compression chamber, an extrusion worm in said chamber, a die plate and a segmental grid-formed cutting knife keyed on said worm shaft.

2. As an article of manufacture a knife element for an extrusion molding machine comprising a segmental element in the form of a grid presenting closely spaced cutting knife surfaces.

3. An extrusion molding machine including in combination a compression chamber, an extrusion worm in said chamber, a die plate closing said chamber, and a number of knives disposed within a minor proportion of the area of the die to sever the extruded material a number of times during each complete extrusion impulse through any given perforation.

4. An extrusion molding machine including in combination a compression chamber, an extrusion worm in said chamber, a die plate closing said chamber, and a segmental knife element of lantern form having a number of radial cutting edges thereon and disposed within 180° of arc for each respective worm start covering only a minor proportion of the total area of the die plate.

ALBERT WILLIAM SIZER.